(12) United States Patent
Hwan et al.

(10) Patent No.: US 9,136,585 B2
(45) Date of Patent: Sep. 15, 2015

(54) RADIO FREQUENCY IDENTIFICATION TAG

(75) Inventors: Lu-Chen Hwan, Taipei (TW); Po Ching Chen, Hsinchu County (TW)

(73) Assignee: Mutual-Pak Technology Co., Ltd., Xinzhuang Dist., New Taipei (TW)

(*) Notice: Subject to any disclaimer, the term of this patent is extended or adjusted under 35 U.S.C. 154(b) by 0 days.

(21) Appl. No.: 13/401,584

(22) Filed: Feb. 21, 2012

(65) Prior Publication Data

US 2013/0140368 A1 Jun. 6, 2013

(30) Foreign Application Priority Data

Dec. 1, 2011 (TW) .............................. 100144145 A

(51) Int. Cl.
G08B 13/14 (2006.01)
G06K 19/077 (2006.01)
H01Q 1/22 (2006.01)
H01Q 9/24 (2006.01)
H01Q 9/28 (2006.01)

(52) U.S. Cl.
CPC ........ H01Q 1/2225 (2013.01); G06K 19/07754 (2013.01); H01Q 9/24 (2013.01); H01Q 9/285 (2013.01)

(58) Field of Classification Search
CPC ............ G06K 7/0008; G06K 19/0723; G06K 19/077; G06K 19/07745; G06K 19/07749; G06K 19/07776; G06K 19/073; G06K 19/0772; G06K 19/07754
See application file for complete search history.

(56) References Cited

U.S. PATENT DOCUMENTS

| | | | |
|---|---|---|---|
| 6,569,508 B2* | 5/2003 | Babb et al. ................... | 428/40.1 |
| 6,657,294 B2* | 12/2003 | Toth et al. ..................... | 257/698 |
| 7,224,278 B2* | 5/2007 | Phaneuf et al. ............ | 340/572.1 |
| 7,339,550 B2* | 3/2008 | Hayama et al. ............... | 343/895 |
| 7,804,411 B2* | 9/2010 | Copeland .................... | 340/572.7 |
| 7,843,341 B2* | 11/2010 | Phaneuf et al. ............ | 340/572.1 |
| 8,248,240 B2* | 8/2012 | Osaki et al. ................. | 340/572.1 |
| 8,297,518 B2* | 10/2012 | Yamazaki et al. ............ | 235/492 |
| 8,339,267 B2* | 12/2012 | Phaneuf ..................... | 340/572.8 |
| 2002/0030598 A1* | 3/2002 | Dombrowski et al. ..... | 340/572.1 |
| 2002/0036237 A1* | 3/2002 | Atherton et al. .............. | 235/492 |
| 2002/0053735 A1* | 5/2002 | Neuhaus et al. .............. | 257/728 |
| 2004/0104274 A1* | 6/2004 | Kotik et al. .................. | 235/492 |
| 2005/0001785 A1* | 1/2005 | Ferguson et al. ............. | 343/895 |
| 2005/0035924 A1* | 2/2005 | Liu et al. ....................... | 343/895 |
| 2006/0043198 A1* | 3/2006 | Forster .......................... | 235/492 |

(Continued)

FOREIGN PATENT DOCUMENTS

CN 101159034 A 4/2008
CN 201047949 Y 4/2008

OTHER PUBLICATIONS

SIPO; Search Report mailed Mar. 23, 2015 in corresponding Chinese Application No. 201110392785.8.

*Primary Examiner* — Daniel Walsh
(74) *Attorney, Agent, or Firm* — Snell & Wilmer L.L.P.

(57) ABSTRACT

A radio frequency identification tag includes a housing shaped as a stripe defining a longitudinal side and an inlay disposed within the housing. The inlay includes a carrier board supporting a packaged chip and a wiring antenna in connection with the packaged chip. The wiring antenna is formed with an electrical joint directly and electrically connecting the packaged chip and an extension portion directly extending out of the electrical joint. The extension direction of the extension portion is substantially perpendicular to the longitudinal side.

11 Claims, 4 Drawing Sheets

(56) References Cited

U.S. PATENT DOCUMENTS

| | | | | |
|---|---|---|---|---|
| 2006/0043199 A1* | | 3/2006 | Baba et al. | 235/492 |
| 2006/0125641 A1* | | 6/2006 | Forster | 340/572.8 |
| 2006/0176181 A1* | | 8/2006 | Halope | 340/572.8 |
| 2006/0214793 A1* | | 9/2006 | Baba | 340/572.1 |
| 2006/0232419 A1* | | 10/2006 | Tomioka et al. | 340/572.7 |
| 2007/0040686 A1* | | 2/2007 | Reis | 340/572.7 |
| 2007/0085685 A1* | | 4/2007 | Phaneuf et al. | 340/572.8 |
| 2007/0090955 A1* | | 4/2007 | Cote et al. | 340/572.5 |
| 2007/0229276 A1* | | 10/2007 | Yamagajo et al. | 340/572.7 |
| 2007/0279230 A1* | | 12/2007 | Lakeman et al. | 340/572.7 |
| 2007/0290051 A1* | | 12/2007 | Bielmann et al. | 235/492 |
| 2007/0296037 A1* | | 12/2007 | Dozen et al. | 257/350 |
| 2008/0036609 A1 | | 2/2008 | Baba et al. | |
| 2008/0072423 A1* | | 3/2008 | Finn | 29/854 |
| 2008/0131669 A1* | | 6/2008 | Michalk | 428/196 |
| 2008/0149731 A1* | | 6/2008 | Arai et al. | 235/492 |
| 2008/0150719 A1* | | 6/2008 | Cote et al. | 340/572.1 |
| 2008/0179404 A1* | | 7/2008 | Finn | 235/492 |
| 2008/0180217 A1* | | 7/2008 | Isabell | 340/10.1 |
| 2008/0180255 A1* | | 7/2008 | Isabell | 340/572.8 |
| 2008/0283615 A1* | | 11/2008 | Finn | 235/488 |
| 2008/0297351 A1* | | 12/2008 | Baba et al. | 340/572.8 |
| 2008/0315992 A1* | | 12/2008 | Forster | 340/10.1 |
| 2009/0096609 A1* | | 4/2009 | Huang et al. | 340/572.1 |
| 2009/0108993 A1* | | 4/2009 | Forster | 340/10.1 |
| 2009/0126861 A1* | | 5/2009 | Chen | 156/184 |
| 2009/0146790 A1* | | 6/2009 | Speich | 340/10.1 |
| 2009/0184824 A1* | | 7/2009 | Forster | 340/572.1 |
| 2009/0224056 A1* | | 9/2009 | Kwon | 235/492 |
| 2009/0230197 A1* | | 9/2009 | Tanner | 235/492 |
| 2010/0025481 A1* | | 2/2010 | Brod et al. | 235/492 |
| 2010/0032487 A1* | | 2/2010 | Bohn et al. | 235/492 |
| 2010/0051703 A1* | | 3/2010 | Kobae | 235/492 |
| 2010/0079290 A1* | | 4/2010 | Phaneuf | 340/572.8 |
| 2010/0134294 A1* | | 6/2010 | Rexer et al. | 340/572.8 |
| 2010/0141453 A1* | | 6/2010 | Finn | 340/572.7 |
| 2010/0177008 A1* | | 7/2010 | Bohn | 343/878 |
| 2010/0258640 A1 | | 10/2010 | Takeuchi et al. | |
| 2010/0277382 A1* | | 11/2010 | Tanaka et al. | 343/741 |
| 2011/0017833 A1* | | 1/2011 | Cullen et al. | 235/492 |
| 2011/0024036 A1* | | 2/2011 | Benato | 156/277 |
| 2011/0042466 A1* | | 2/2011 | Kim et al. | 235/492 |
| 2011/0101112 A1* | | 5/2011 | Phillips et al. | 235/492 |
| 2011/0114734 A1* | | 5/2011 | Tiedmann et al. | 235/492 |
| 2011/0147467 A1* | | 6/2011 | Choi | 235/492 |
| 2011/0233281 A1* | | 9/2011 | Howell | 235/488 |
| 2012/0000065 A1* | | 1/2012 | Bohn | 29/601 |
| 2012/0006904 A1* | | 1/2012 | Kato et al. | 235/492 |
| 2012/0061473 A1* | | 3/2012 | Forster et al. | 235/492 |
| 2012/0218110 A1* | | 8/2012 | Forster | 340/572.1 |
| 2013/0062419 A1* | | 3/2013 | Finn et al. | 235/492 |
| 2013/0075481 A1* | | 3/2013 | Raymond et al. | 235/492 |
| 2013/0113627 A1* | | 5/2013 | Tiedmann | 340/572.1 |
| 2013/0140368 A1* | | 6/2013 | Hwan et al. | 235/492 |
| 2014/0144992 A1* | | 5/2014 | Diorio et al. | 235/488 |
| 2014/0263661 A1* | | 9/2014 | Lu | 235/492 |

* cited by examiner

RADIO FREQUENCY IDENTIFICATION TAG

RELATED APPLICATIONS

This application claims the right of priority based on Taiwan Patent Application No. 100144145, entitled "RADIO FREQUENCY IDENTIFICATION TAG," filed on Dec. 1, 2011. The entire content of the aforementioned application is incorporated herein by reference.

FIELD OF THE INVENTION

The present invention relates to a radio frequency identification tag and specifically to a radio frequency identification tag suitable for the laundry industry.

BACKGROUND OF THE INVENTION

In recent years, wireless chip devices that can wirelessly transmit and receive signals have been extensively developed. Such chips capable of wirelessly transmitting and receiving signals are generally referred to radio frequency identification (RFID) tag or RF tag, RF chip, wireless tag, wireless processor, wireless memory, integrated circuit (IC) tag, electronic tag, etc. The radio frequency identification tag can be used, for all kinds of purposes, as the markings on various objects to achieve versatile use, such as identification, authentication, or tracking.

The radio frequency identification tag typically has a housing made of silicone rubber and an inlay disposed in the housing. The inlay usually includes a chip and a wiring antenna disposed on a carrier board, wherein the wiring antenna is in connection with the chip. Since the RFID tag has an electronic structure, the RFID tag should be properly protected from damage during use. In particular, when the RFID tag is applied to industrial laundry, special protection mechanism is significantly important because the laundry processes of washing, spinning, drying, etc. will easily damage the RFID tag attached to the clothes. Therefore, there is a need for a novel RFID tag to overcome the above-mentioned problems.

SUMMARY OF THE INVENTION

One aspect of the present invention is to provide a novel radio frequency identification tag having the advantages of preventing or reducing its damage or breakage during use.

In one embodiment, the present invention provides a radio frequency identification tag including: a housing shaped as a stripe defining a longitudinal side; and an inlay disposed within the housing, the inlay including a carrier board supporting a packaged chip and a wiring antenna in connection with the packaged chip, the wiring antenna further including: an electrical joint directly and electrically connecting the packaged chip; and an extension portion directly extending out of the electrical joint, wherein the extension direction of the extension portion is substantially perpendicular to the longitudinal side.

In another embodiment, the present invention provides a novel radio frequency identification tag, in addition to the features described in the above embodiment, further including a cladding layer located between the housing and the inlay, wherein the cladding layer at least completely covers the packaged chip and a portion of the wiring antenna surrounding the packaged chip.

In a further embodiment, the present invention provides a radio frequency identification tag, in addition to the features described in the above embodiments, further characterized in that the wiring antenna further includes a further extension portion connected to the extension portion; the further extension portion is located around the packaged chip and connected to the extension portion via a curved portion, wherein the further extension portion has a horizontal section substantially parallel to the longitudinal side and a vertical section substantially perpendicular to the longitudinal side, and the vertical section is longer than the horizontal section.

In a further another embodiment, the present invention provides a radio frequency identification tag, in addition to the features described in the above embodiments, further characterized in that the packaged chip has a longer side and a shorter side, the extension portion extends from the shorter side, and the extension direction of the extension portion is substantially perpendicular to the shorter side.

In yet another embodiment, the present invention provides a radio frequency identification tag, in addition to the features described in the above embodiments, further characterized in that the packaged chip includes a package cover covering a chip and a package board supporting the chip, wherein the material of the package board includes fiber-reinforced resin; the electrical joint includes a contact surface in contact with the package board, and the area of the contact surface is 10% to 30% of the bottom area of the packaged chip.

Other aspects and various embodiments included in the present invention to solve other problems and combined with the above aspects are disclosed in the following detailed descriptions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings. In the drawings.

DETAILED DESCRIPTION OF THE INVENTION

The preferred embodiment of the present invention is illustrated by referring the accompanying drawings. Similar elements in the accompanying drawings employ the same numeral references. It should be noted that in order to clearly illustrate the present invention, each element in the accompanying drawings is not drawn to scale as the actual object. Also, in order to avoid obscuring the content of the present invention, the conventional components, related material, and related processing techniques are omitted in the following description.

Figure 1:
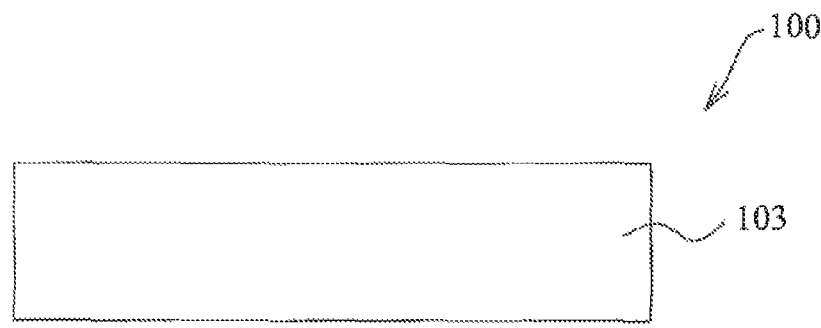
FIG. 1 illustrates a top view of the radio frequency identification tag.
Figure 2:
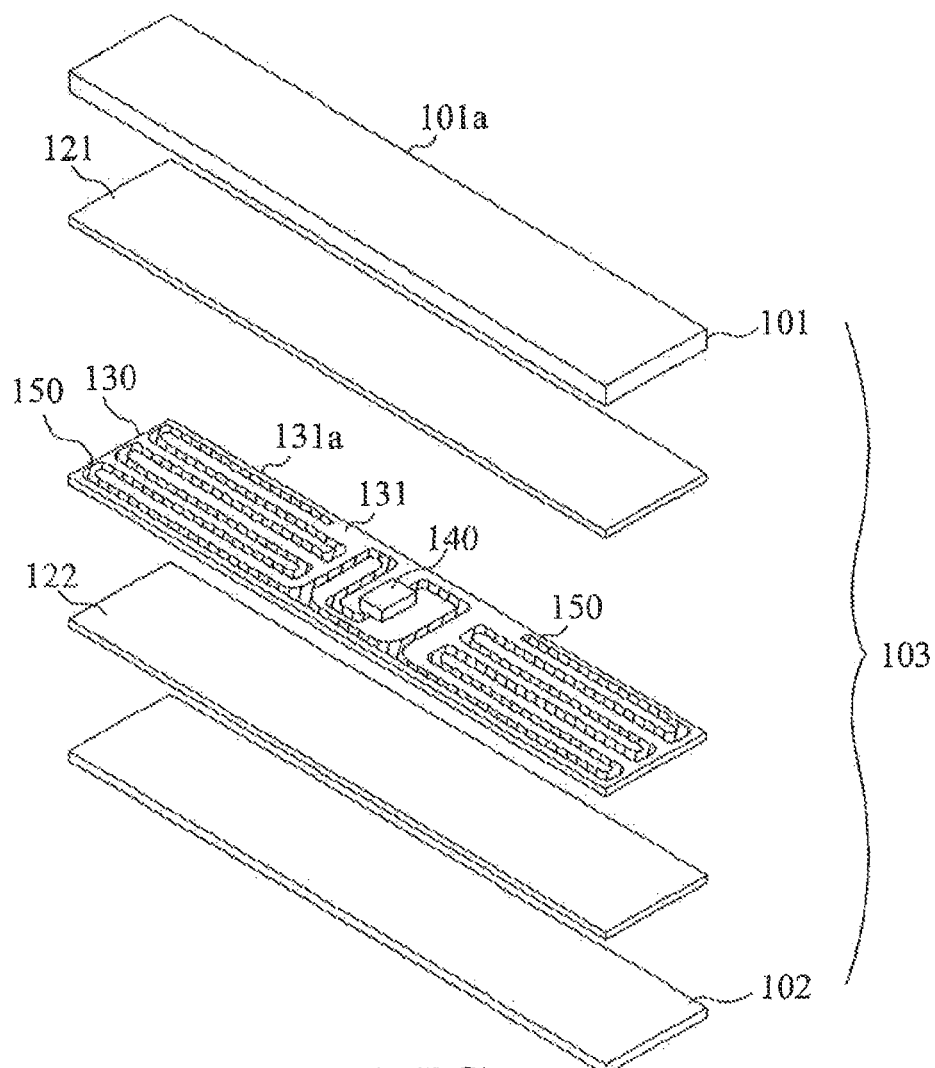
FIG. 2 illustrates an exploded view of the radio frequency identification tag.
Figure 3:
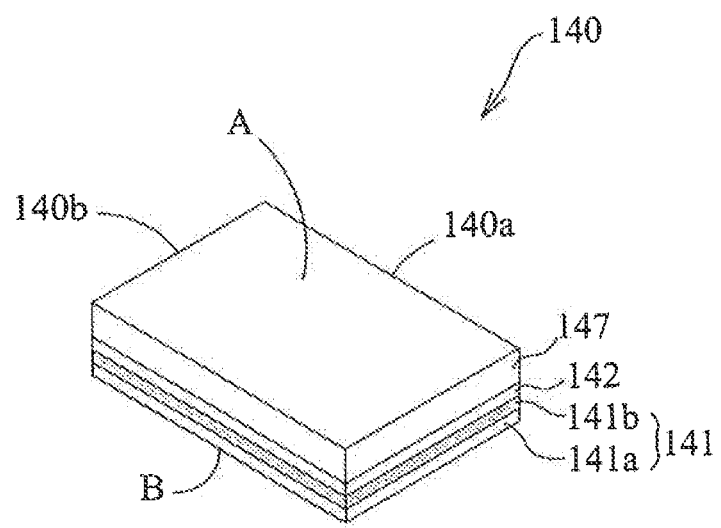
FIG. 3 illustrates a front perspective view of the packaged chip of the radio frequency identification tag.
Figure 4:
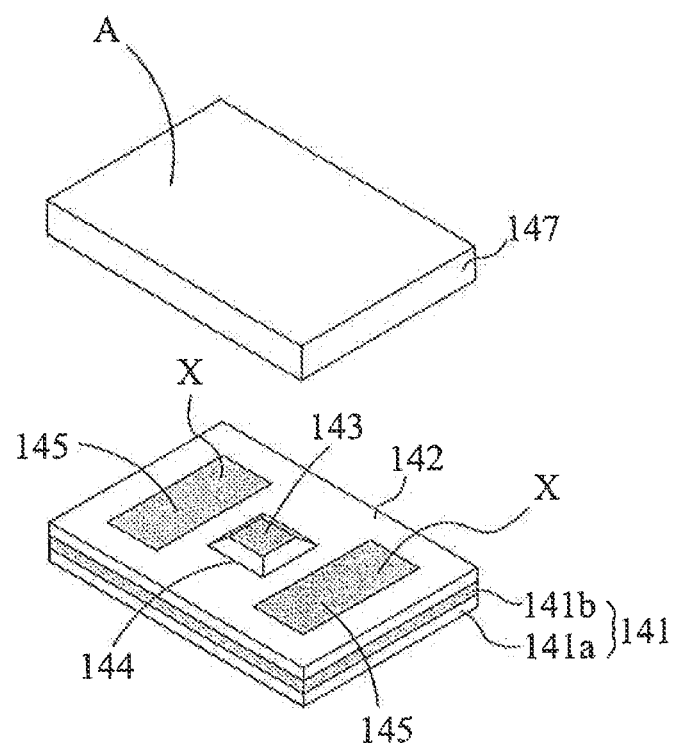
FIG. 4 illustrates an exploded view of the packaged chip.
Figure 5:
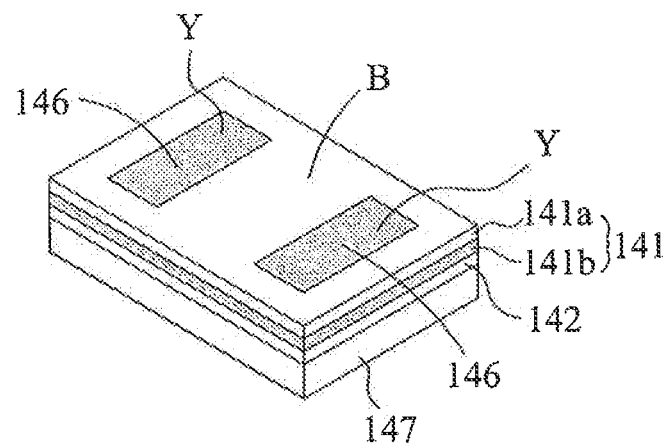
FIG. 5 illustrates a rear perspective view of the packaged chip.
Figure 6:
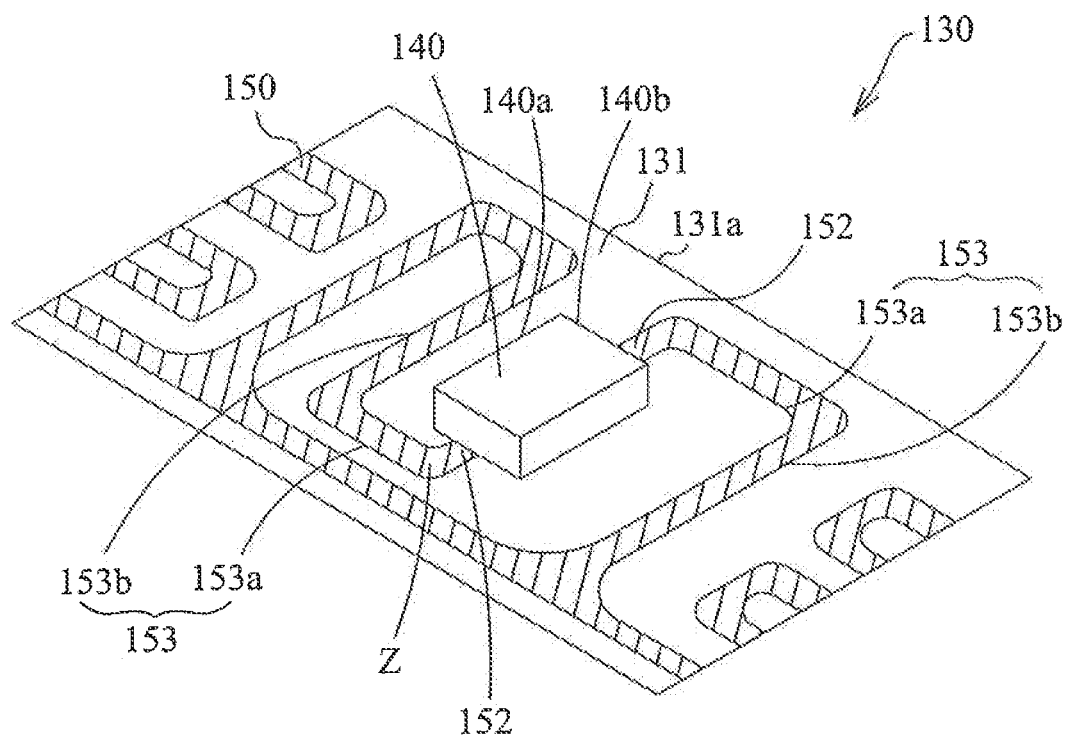
FIG. 6 illustrates a partial enlarged view of the inlay of the radio frequency identification tag.
Figure 7:
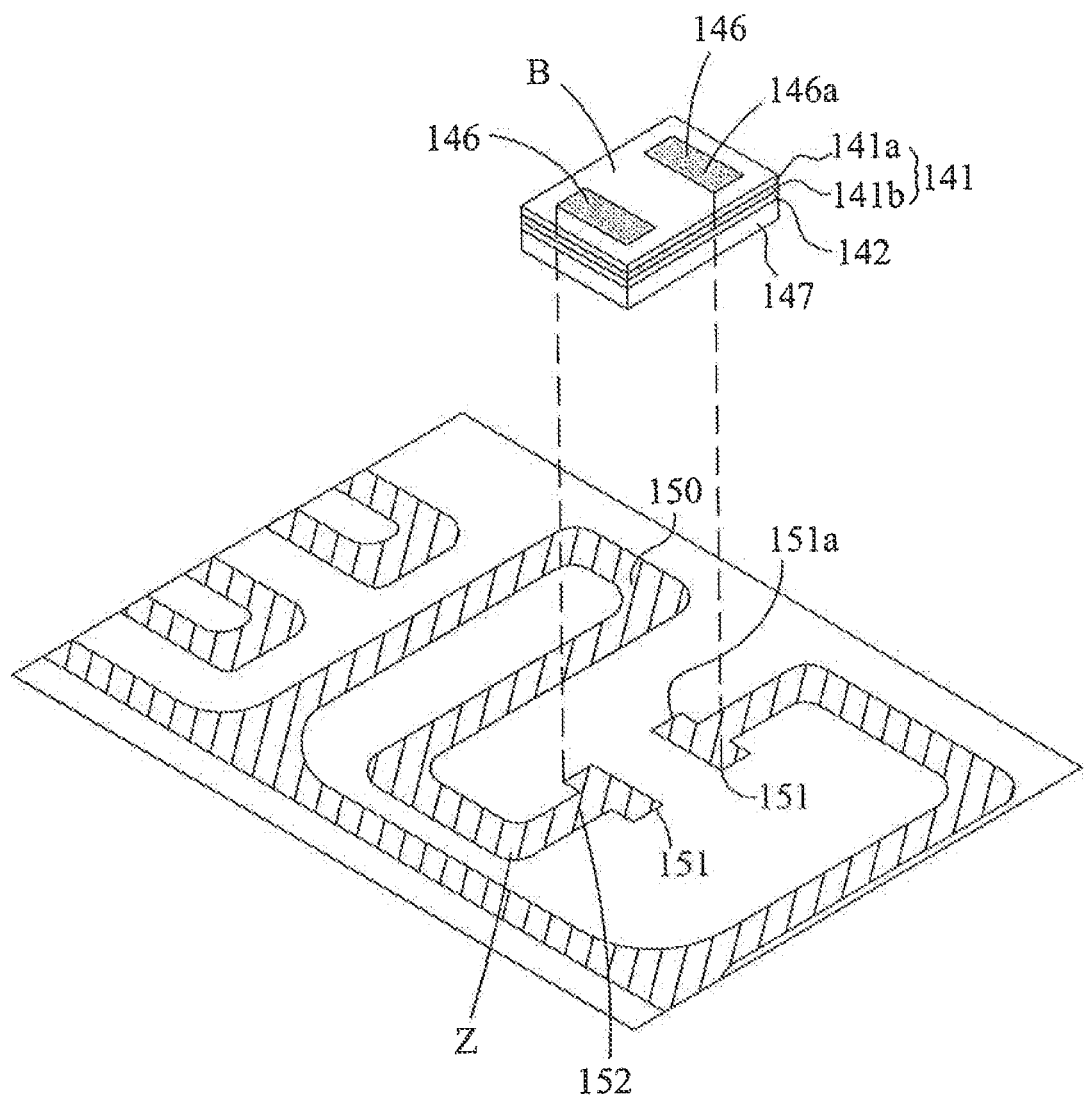
FIG. 7 illustrates a schematic view showing the connection between the wiring antenna of the inlay and the packaged chip.

FIG. 1 to FIG. 6 illustrate a preferred embodiment of a radio frequency identification tag of the present invention. FIG. 1 illustrates a top view of a radio frequency identification tag 100 observed from its outer appearance. FIG. 2 illustrates an exploded view of the radio frequency identification tag 100. FIG. 3 illustrates a front perspective view of a packaged chip 140 of the radio frequency identification tag 100. FIG. 4 illustrates an exploded view of the packaged chip 140. FIG. 5 illustrates a rear perspective view of the packaged chip 140. FIG. 6 illustrates a partial enlarged view of an inlay 130 of the radio frequency identification tag 100. FIG. 7 illustrates a schematic view showing the connection between a wiring antenna 150 of the inlay 130 and the packaged chip 140.

Referring to FIG. 1 and FIG. 2, the radio frequency identification tag 100 includes a housing 103, an inlay 130, an upper cladding layer 121, and a lower cladding layer 122. The housing 103 is composed of an upper housing 101 and a lower housing 102 combined with each other. The housing 103 can be made of silicone or other suitable materials. In other embodiments, the upper housing 101 and the lower housing 102 can be integrally formed into one piece. In this embodiment, the inlay 130, the upper cladding layer 121, and the lower cladding layer 122 are all disposed inside the housing 103. The housing 103 is shaped as a stripe defining a longitudinal side 101a, which is preferred for use in the laundry industry, but not limited thereto. The present invention can be applicable to other industries or other applications.

Referring to FIG. 2, the inlay 130 includes a carrier board 131 supporting a packaged chip 140 thereon and a wiring antenna 150 in connection with the packaged chip 140. In this embodiment, the carrier board 131 is shaped as a stripe similar to the housing 103 and accordingly has a longitudinal side 131a, which is substantially parallel to the longitudinal side 101a of the housing 103. In this embodiment, the thickness of the packaged chip 140 is between 0.45 mm and 0.8 mm. The packaged chip 140 is disposed at the middle along the longitudinal side 131a while the wiring antenna 150 is distributed around two sides of the packaged chip 140. In this embodiment, the area of the carrier board 131 is substantially equal to the area of the housing 103. In other words, since the carrier board 131 is accommodated within the housing 103, the area of the carrier board 131 is slightly smaller than the area of the housing 103. In other embodiments, the area of the carrier board can be smaller than the area of the carrier board 131 of the embodiment. For example, the area ratio of the carrier board to the carrier board 131 of the embodiment can be 4/5, 2/3, or even smaller. The packaged chip and the wiring antenna can also be disposed to other suitable locations.

Again referring to FIG. 2, the upper cladding layer 121 is disposed between the upper housing 101 and the inlay 130. The lower cladding layer 122 is disposed between the lower housing 102 and the inlay 130. In this embodiment, the cladding layer 121/122 is shaped as a stripe similar to the housing 103, wherein the area of the cladding layer 121/122 is substantially equal to the area of the housing 103. In other words, since the cladding layer 121/122 is disposed within the housing 103, the area of the cladding layer 121/122 is slightly smaller than the area of the housing 103. In this embodiment, the thickness of the cladding layer 121/122 is about 1.5 Mils to 1.3 Mils. It can be seen from the drawing that the cladding layer 121/122 at least completely covers the packaged chip 140 and the wiring antenna 150. In other embodiments, the cladding layer can have other suitable shapes and areas.

The material of the cladding layer can be polyimide, polyethylene terephthalate, or other suitable materials. The cladding layer can provide appropriate flexibility when the radio frequency identification tag is bent under force. Therefore, in this embodiment, the cladding layer at least completely covers the packaged chip and the wiring antenna, preventing damage or breakage of the radio frequency identification tag caused by over-bending. As the radio frequency identification tag is bent under force, the wiring antenna around the packaged chip is more likely susceptible to breakage. Therefore, in other embodiments, the cladding layer can be designed to cover the packaged chip completely as well as only a portion of the wiring antenna located around the packaged chip, instead of the entire wiring antenna. The use of the cladding layer is optional. In other words, if the radio frequency identification tag can provide sufficient flexibility while being bent under force, then the cladding layer can be omitted. In other embodiments, the radio frequency identification tag has no cladding layer or has only one cladding layer.

Hereinafter, the structure of the packaged chip 140 is described in detail. FIG. 3 illustrates a front perspective view of the packaged chip 140 of the radio frequency identification tag 100. FIG. 4 illustrates an exploded view of the packed chip 140. FIG. 5 illustrates a rear perspective view of the packaged chip 140. As shown, in this embodiment, the packaged chip 140 has a hexahedron structure defining a longer side 140a, a shorter side 140b, a front surface A, and a rear surface B. The packaged chip 140 includes a package board 141, a surface insulation layer 142, a chip 143, an underfill layer 144, and a package cover 147. The surface insulation layer 142, the chip 143, the underfill layer 144, and the package cover 147 are located on the same side of the package board 141. The package board 141 includes a bottom insulation layer 141a and a wiring layer 141b. The surface insulation layer 142, the chip 143, and the underfill layer 144 are disposed on the package board 141. The package cover 147 covers the surface insulation layer 142, the chip 143, and the underfill layer 144. The wiring layer 141b is electrically connected to the chip 143. The surface insulation layer 142 has an opening X; the bottom insulation layer 141a has an opening Y. The opening X exposes a portion of the wiring layer 141b to form a front contact point 145. The front contact point 145 will be covered by the package cover 147. The opening Y exposes a portion of the wiring layer 141b to form a rear contact point 146. The rear contact point 146 is exposed on the rear surface B of the packaged chip 140. The rear contact point 146 is configured to couple with the wiring antenna 150 on the inlay 130. In this embodiment, the rear contact point 146 has a stripe shape, but is not limited thereto; the packaged chip 140 is exemplarily illustrated as a hexahedron, but not limited thereto. The structure and manufacture method of the chip 143 can refer to Taiwanese Patent Application No. 97120461, which is incorporated herein as a reference by its entirety. However, it is noted that chips having other structures are also considered in the embodiments of the present invention.

Also referring to FIG. 3 to FIG. 5, the surface insulation layer 142 can have another opening (not shown) to allow the chip 143 mounted on the package board 141 to electrically connect the wiring layer 141b. The underfill layer 144 is formed on the surface insulation layer 142 and surrounds the chip 143 to fix the chip 143 onto the package board 141. The material of the underfill layer 144 includes epoxy, polypropylene, acryl resin, silicone, any combination thereof, or other suitable materials. The material of the surface insulation layer 142 can be a general solder mask or other suitable materials including polyimide. The material of the bottom insulation layer 141a of the package board 141 can be all kinds of materials commonly used in printed circuit boards. The material of the wiring layer 141b of the package board 141 can be copper or any suitable conductive materials. Preferably, the package board 141 is a two-layer flexible copper clad laminate (2-L FCCL), wherein using the extending copper as the wiring layer is most preferred. The package cover 147 covers the chip 143 fixed onto the package board 141 to complete the structure of the packaged chip 140. The material of the package cover 147 can be epoxy, polyimide, benzocyclobutane, liquid crystal polymer, or any other suitable dielectric materials.

Hereinafter, the connection between the wiring antenna 150 and the packaged chip 140 will be described in detail. FIG. 6 illustrates a partial enlarged view of the inlay 130. FIG. 7 illustrates a schematic view showing the connection between the wiring antenna 150 and the packaged chip 140. As shown in FIG. 6 and FIG. 7, the inlay 130 includes a carrier board 131, wherein the packaged chip 140 and the wiring antenna 150 in connection with the packaged chip 140 are disposed on the carrier board 131. The carrier board 131 has a longitudinal side 131a; the packaged chip 140 is disposed at the middle along the longitudinal side 131a; the wiring antenna 150 is distributed around two sides of the packaged chip 140. The wiring antenna 150 includes electrical joints 151 directly and electrically connecting the rear contact points 146 of the packaged chip. In this embodiment, the electrical joint 151 is exemplarily shaped as a stripe corresponding to the rear contact point 146, but not limited thereto. The dotted lines shown in FIG. 7 indicate the connection between the electrical joints 151 and the contact points 146. The connection can be achieved by solder paste or other suitable techniques. In this embodiment, the electrical joint 151 includes a contact surface 151a soldered with the rear contact point 146; the area of the contact surface 151a is about 15% of the bottom area of the packaged chip 140. In this embodiment, two electrical joints 151 are provided; the above mentioned area ratio is determined for one electrical joint 151. In general cases, the area of the contact surface 151a is not limited to the above embodiment. In case where processes of washing, spinning, drying, etc. are concerned, such as in the laundry industry, in order to ensure reliable connection between the electrical joint 151 and the contact point 146 to prevent malfunction caused by poor connection, the area of each electrical joint 151 is preferably at least 10% to 30% of the bottom area of the packaged chip 140. Similarly, the contact point 146 also includes a contact surface 146a; the area of each contact surface 146a is preferably at least 10% to 30% of the bottom area of the packaged chip 140.

Referring to FIG. 7, in addition to the electrical joints 151, the wiring antenna 150 further includes an extension portion 152 directly extending out of the electrical joint 151. Since the radio frequency identification tag 100 is shaped as a stripe, the radio frequency identification tag 100 is susceptible to be bent with the shorter side of the stripe as a bending axis, wherein the shorter side is substantially perpendicular to the longitudinal side 101a. Thus, in order to prevent the extension portion 152 from damage or breakage caused by the bending of the radio frequency identification tag 100, the extension direction of the extension portion 152 is substantially perpendicular to the longitudinal side 101a of the housing 103, i.e. substantially parallel to the bending axis. As such, the breakage of the wiring can be avoided.

Moreover, the wiring antenna 150 further includes a further extension portion 153. The further extension portion 153 is located around the packaged chip 140 and connected to the extension portion 152 through a curved portion Z. The further extension portion 153 has a horizontal section 153a substantially parallel to the longitudinal side 101a of the housing 103 and a vertical section 153b substantially perpendicular to the longitudinal side 101a of the housing 103. Since the radio frequency identification tag 100 is shaped as a stripe, the radio frequency identification tag 100 is susceptible to be bent with the shorter side of the stripe as a bending axis, wherein the shorter side is substantially perpendicular to the longitudinal side 101a. Thus, in the wiring antenna 150, the horizontal section 153a substantially parallel to the longitudinal side 101a is more susceptible to the bending and damage than the vertical section 153b. In order to prevent the further extension portion 153 from damage or breakage caused by the bending of the radio frequency identification tag 100, the vertical section 153b of the further extension portion 153 is preferably longer than the horizontal section 153a. In other words, the horizontal section 153a is reduced as much as possible to reduce the possibility of breakage. In this embodiment, the wiring antenna 150 includes the feature that the extension portion 152 is substantially perpendicular to the longitudinal side 101a of the housing 103, and also includes the feature that the vertical section 153b of the further extension portion 153 is preferably longer than the horizontal section 153a. In other embodiments, the wiring antenna 150 can include one of the features described above.

Furthermore, in this embodiment, the packaged chip 140 is shaped as a stripe that defines a longer side 140a and a shorter side 140b. The packaged chip 140 is disposed on the carrier board 131 in an orientation that the shorter side 104b is substantially parallel to the longitudinal side 101a. In other words, the extension portion 152 extends from the shorter side 140b; that is, the extension direction of the extension portion 152 is substantially perpendicular to the shorter side 140b. Such feature can further improve the structural stability of the radio frequency identification tag of the present invention. However, it is noted that the present invention also includes various embodiments, wherein the packaged chip can be shaped or not shaped as a stripe with or without such feature described above.

It is noted that the term "substantially perpendicular" means the angle included therein is in a range between 85 to 95 degrees; the term "substantially parallel" means the angle included therein is in a range between 175 to 185 degrees.

It is further noted that FIG. 1 to FIG. 6 merely illustrate the preferred embodiment of the radio frequency identification tag of the present invention; various embodiments illustrated in the content of the specification are also included in the present invention. The foregoing embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A flexible radio frequency identification tag, comprising:
   a housing shaped as a stripe defining a longitudinal side; and
   an inlay disposed within the housing, the inlay comprising a carrier board supporting a packaged chip and a wiring antenna in connection with the packaged chip, the carrier board shaped as a stripe defining a longitudinal side substantially parallel to the longitudinal side of the housing, the packaged chip shaped as a rectangular hexahedron defining a longer side and two opposite shorter sides connected by the longer side, the longer side and the shorter sides being substantially parallel to the carrier board, the shorter sides being substantially parallel to the longitudinal side of the housing, the packaged chip having at least two rear contact points, the wiring antenna further comprising:
- at least two electrical joints being electrically connected to the rear contact points respectively and being completely covered by the packaged chip, the electrical joints respectively facing the rear contact points, shapes of the electrical joints respectively corresponding to shapes of the rear contact points; and
- at least two extension portions directly extending out of the electrical joints respectively, wherein the extension direction of each of the extension portions is substantially perpendicular to the longitudinal side of the housing, and the extension portions respectively extend from the shorter sides;

wherein the wiring antenna further comprises at least two further extension portions directly connected to the extension portions respectively, each of the further extension is located around the packaged chip and has a curved portion, a horizontal section and a vertical section, the curved portions are directly connected to the extension portions respectively, the horizontal sections substantially parallel to the longitudinal side of the housing are directly connected to the curved portions respectively, the vertical sections substantially perpendicular to the longitudinal side of the housing are connected to the horizontal sections respectively, each of the horizontal sections is connected between the corresponding one of the curved portions and the corresponding one of the vertical sections, and in each of the further extension portions, the vertical section is longer than the horizontal section.

2. The flexible radio frequency identification tag of claim 1, further comprising a cladding layer located between the housing and the inlay, wherein the cladding layer at least completely covers the packaged chip and a portion of the wiring antenna surrounding the packaged chip.

3. The flexible radio frequency identification tag of claim 1, wherein the packaged chip comprises a package cover covering a chip and a package board supporting the chip, the material of the package board comprises fiber-reinforced resin.

4. The flexible radio frequency identification tag of claim 3, wherein the package board includes the rear contact points, an area of each of the rear contact points is 10% to 30% of a bottom area of the packaged chip, and an area of each of the electrical joints is 10% to 30% of the bottom area of the packaged chip.

5. The flexible radio frequency identification tag of claim 4, wherein each of the electrical joints is connected to the corresponding one of the rear contact points via a solder paste.

6. The flexible radio frequency identification tag of claim 3, wherein the package board is a two-layer flexible copper clad laminate (2-L FCCL).

7. The flexible radio frequency identification tag of claim 1, wherein the housing is made of silicone.

8. A cloth, comprising:
a fabric body; and
a flexible radio frequency identification tag disposed on the fabric body, comprising:
- a housing shaped as a stripe defining a longitudinal side; and
- an inlay disposed within the housing, the inlay comprising a carrier board supporting a packaged chip and a wiring antenna in connection with the packaged chip, the packaged chip comprising a package cover covering a chip and a package board supporting the chip, the package board including a rear contact point, an area of the rear contact point is 10% to 30% of a bottom area of the packaged chip, the wiring antenna further comprising:
    - an electrical joint being electrically connected to the rear contact point and being completely covered by the packaged chip, the electrical joint facing the rear contact point, a shape of the electrical joint corresponding to a shape of the rear contact point, wherein an area of the electrical joint is 10% to 30% of the bottom area of the packaged chip;
    - an extension portion directly extending out of the electrical joint, wherein the extension direction of the extension portion is substantially perpendicular to the longitudinal side; wherein the wiring antenna further comprises a further extension portion directly connected to the extension portion, the further extension portion is located around the packaged chip and has a curved portion, a horizontal section and a vertical section, the curved portion is directly connected to the extension portion, the horizontal section substantially parallel to the longitudinal side is directly connected to the curved portion, the vertical section substantially perpendicular to the longitudinal side is connected to the horizontal section, the horizontal section is connected between the curved portion and the vertical section, and the vertical section is longer than the horizontal section; and wherein the carrier board is shaped as a stripe defining a longitudinal side substantially parallel to the longitudinal side of the housing, the packaged chip shaped as a rectangular hexahedron defining a longer side and a shorter side, the longer side and the shorter side being substantially parallel to the carrier board, the shorter side being substantially parallel to the longitudinal side of the housing, wherein the extension portion extends from the shorter side.

9. The cloth of claim 8, the flexible radio frequency identification tag further comprising a cladding layer located between the housing and the inlay, wherein the cladding layer at least completely covers the packaged chip and a portion of the wiring antenna surrounding the packaged chip.

10. The cloth of claim 8, wherein the housing is made of silicone.

11. A cloth, comprising:
a fabric body; and
a flexible radio frequency identification tag according to claim 1 disposed on the fabric body.

\* \* \* \* \*